US012536539B2

(12) United States Patent
Mossoba et al.

(10) Patent No.: US 12,536,539 B2
(45) Date of Patent: *Jan. 27, 2026

(54) IDENTITY VERIFICATION USING A VIRTUAL CREDENTIAL

(71) Applicant: Capital One Services, LLC, McLean, VA (US)

(72) Inventors: Michael Mossoba, Great Falls, VA (US); Sophie Bermudez, Dartmouth, MA (US); Timur Sherif, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,720

(22) Filed: May 7, 2024

(65) Prior Publication Data

US 2024/0289797 A1  Aug. 29, 2024

Related U.S. Application Data

(63) Continuation of application No. 17/649,724, filed on Feb. 2, 2022, now Pat. No. 12,045,818.

(51) Int. Cl.
*G06Q 20/40* (2012.01)
*G06Q 50/00* (2024.01)

(52) U.S. Cl.
CPC ......... *G06Q 20/4014* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 9,235,695 B2 | 1/2016 | Markwordt et al. | |
| 9,471,936 B2 | 10/2016 | Fleischman | |
| 2007/0260556 A1* | 11/2007 | Pousti | G06Q 20/401 705/75 |
| 2023/0138035 A1* | 5/2023 | Lott | G06Q 20/4014 705/44 |
| 2023/0208644 A1* | 6/2023 | Fitzpatrick | G06F 21/31 713/155 |
| 2023/0245125 A1 | 8/2023 | Mossoba et al. | |

* cited by examiner

*Primary Examiner* — David P Sharvin
(74) *Attorney, Agent, or Firm* — Harrity & Harrity, LLP

(57) ABSTRACT

In some implementations, an identity verification device may receive a request to verify an identity associated with a user accessing a social media account to share information on a social media platform. The identity verification device may generate, based on the request, a virtual credential linked to a primary credential associated with a financial account belonging to a holder of the social media account. The virtual credential may be used in an identity verification transaction to prove that the user accessing the social media account has access to the financial account associated with the social media account holder. The identity verification device may store a record indicating that the virtual credential was used to conduct the identity verification transaction and may provide, to the social media platform, information to verify the identity associated with the user accessing the social media account based on the record.

20 Claims, 6 Drawing Sheets

IDENTITY VERIFICATION USING A VIRTUAL CREDENTIAL

RELATED APPLICATION

This application is a continuation of U.S. patent application Ser. No. 17/649,724, filed Feb. 2, 2022, which is incorporated herein by reference in its entirety.

BACKGROUND

Impersonation or identity theft may occur when the name, image, or other identifying elements of a person, company, or organization are used for illegitimate purposes. In particular, impersonation or identity theft may occur when an account is opened using the name, image, or other identifying elements of a person, company, or organization and/or when a legitimate account is accessed and used to engage in unauthorized activities. For example, scammers may impersonate a brand or its employees in order to obtain sensitive customer information or data, such as social security numbers, passwords, or bank details. In another example, fake brand pages may be created to deceive consumers into purchasing inauthentic products. In still another example, notable accounts on social media platforms (e.g., politicians, celebrities, and/or public institutions) may be compromised or impersonated to create, spread, or disseminate false, inaccurate, or misleading information, commonly referred to as misinformation or fake news.

SUMMARY

Some implementations described herein relate to a system for verifying an identity associated with a user. The system may include one or more memories and one or more processors communicatively coupled to the one or more memories. The one or more processors may be configured to receive, from a user device, a request to verify an identity associated with a user accessing a social media account to share information on a social media platform. The one or more processors may be configured to generate, based on the request, a virtual credential linked to a primary credential associated with a financial account that is associated with a holder of the social media account. The one or more processors may be configured to use the virtual credential to conduct an identity verification transaction associated with one or more attributes to prove that the user accessing the social media account has access to the financial account associated with the holder of the social media account. The one or more processors may be configured to store a record indicating that the virtual credential was used to conduct the identity verification transaction. The one or more processors may be configured to provide, to the social media platform, information to verify the identity associated with the user accessing the social media account based on the record indicating that the virtual credential was used to conduct the identity verification transaction.

Some implementations described herein relate to a method for verifying an identity associated with a user. The method may include receiving, by an identity verification device, a request from a user device to verify an identity associated with a user accessing a first account to create information. The method may include generating, by the identity verification device, a virtual credential linked to a primary credential associated with a second account associated with a holder of the first account, where the primary credential is associated with one or more proof of identity requirements that were satisfied to establish the second account, and where the virtual credential is generated based on the user providing information to indicate that the user is authorized to access the second account. The method may include using, by the identity verification device, the virtual credential to conduct an identity verification transaction associated with one or more attributes to prove that the user accessing the first account has access to the second account associated with the holder of the first account. The method may include storing, by the identity verification device, a record that includes the one or more attributes to indicate that the virtual credential was used to conduct the identity verification transaction. The method may include providing, by the identity verification device to an information receiving device, information to verify the identity associated with the user accessing the first account based on the record indicating that the virtual credential was used to conduct the identity verification transaction.

Some implementations described herein relate to a non-transitory computer-readable medium that stores a set of instructions. The set of instructions may include one or more instructions that, when executed by one or more processors of an identity verification system, cause the identity verification system to receive, from a user device, a request to verify an identity associated with a user accessing a social media account to share information on a social media platform. The one or more instructions, when executed by the one or more processors of the identity verification system, may cause the identity verification system to receive, from the user device, information indicating that the user accessing the social media account is authorized to access a financial account associated with a holder of the social media account. The one or more instructions, when executed by the one or more processors of the identity verification system, may cause the identity verification system to generate, based on the information indicating that the user is authorized to access the financial account, a virtual credential linked to a primary credential associated with the financial account associated with the holder of the social media account. The one or more instructions, when executed by the one or more processors of the identity verification system, may cause the identity verification system to use the virtual credential to conduct an identity verification transaction associated with one or more attributes to prove that the user accessing the social media account has access to the financial account associated with the holder of the social media account. The one or more instructions, when executed by the one or more processors of the identity verification system, may cause the identity verification system to store a record indicating that the virtual credential was used to conduct the identity verification transaction. The one or more instructions, when executed by the one or more processors of the identity verification system, may cause the identity verification system to provide, to the user device, a link to the record indicating that the virtual credential was used to conduct the identity verification transaction.

DETAILED DESCRIPTION

Figure 1A:
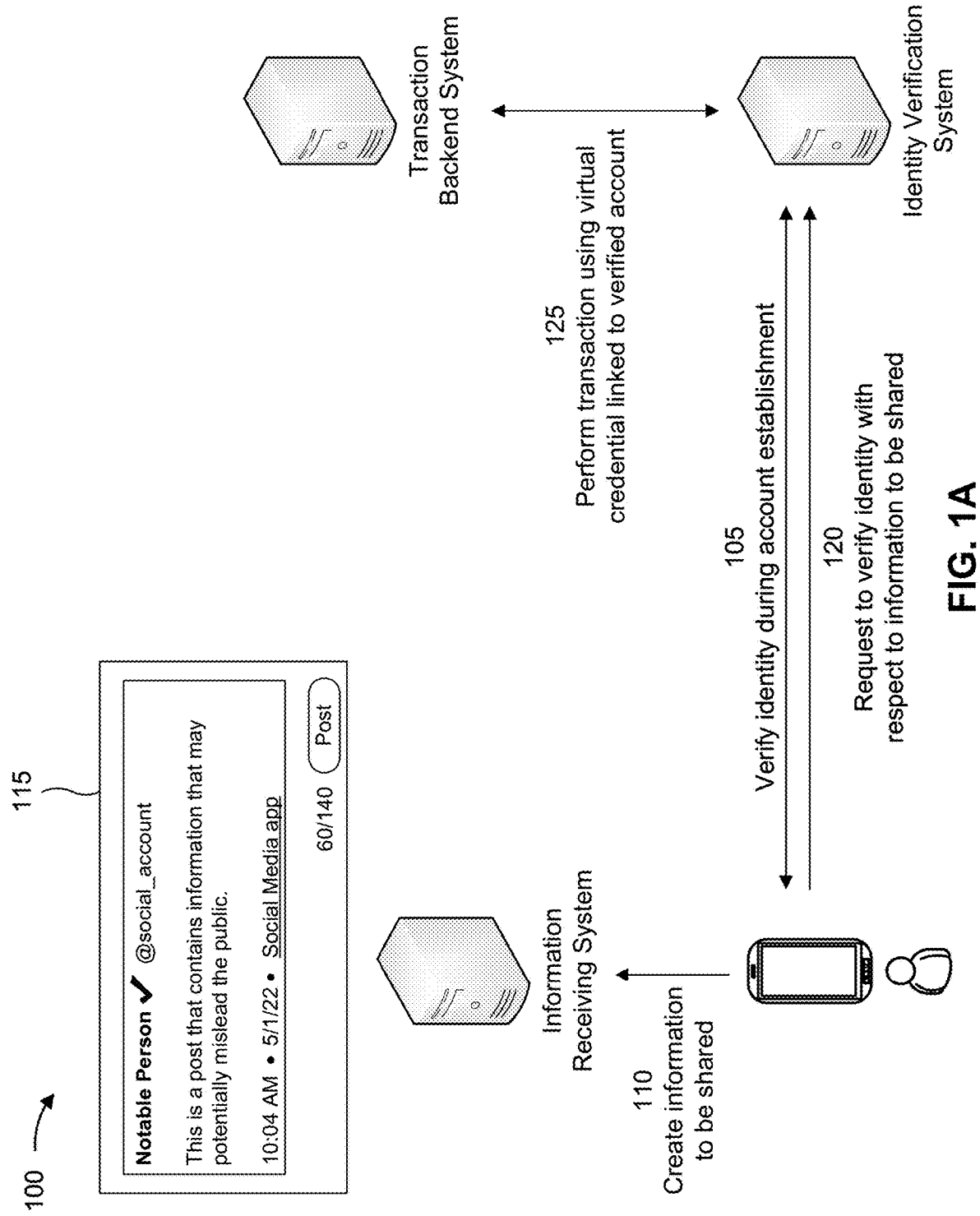
FIGS. 1A-1C are diagrams of an example implementation relating to identity verification using a virtual credential.

The following detailed description of example implementations refers to the accompanying drawings. The same reference numbers in different drawings may identify the same or similar elements.

Social media platforms have significant influence in society, which has led to a rise in social media impersonation. For example, social media impersonation may occur when a social media page or a social media account is created to look or appear like the legitimate social media page or social media account of a particular person, company, or organization. Additionally, or alternatively, social media impersonation may occur when a legitimate social media page or social media account is compromised and used by a hacker or imposter for nefarious purposes. For example, social media imposters may use compromised accounts or accounts that appear to be legitimate accounts in order to collect information on users that follow the accounts, to market fraudulent promotions, to spread misinformation or disinformation, and/or to spread links to malware and/or phishing sites across social networks using social engineering.

Although issues related to impersonation on social media platforms are generally well-established, efforts to combat impersonation fall short in providing reliable proof that a post on a social media page is legitimate. For example, one technique that social media platforms often employ to prevent impersonation is to add an identity verification layer to notable accounts (e.g., celebrities, politicians, organizations, and/or public figures, among other examples). The identity verification layer is typically performed using manual checks, where the authenticity of physical identity documents (e.g., a driver's license, passport, or corporate document, among other examples) and/or identity data fields are verified against independent and authoritative sources, such as government data or credit bureau data. In cases where the user of the notable account is verified to be the actual person, company, or organization, the social media platform may include a verification mark (e.g., a green checkmark) next to the account information and/or on any information posted using the notable account to indicate that the identity of the notable account has been verified. However, verified notable accounts can still be compromised (e.g., when a hacker or imposter surreptitiously obtains the username and password) and used to create or spread misinformation or disinformation. Furthermore, social media platforms often do not perform identity verification for everyday users and/or delegate responsibility for identifying and reporting any impersonation to the victim(s) or affected user(s). Furthermore, the risks and challenges associated with digital impersonation are widespread and can occur on many digital platforms, which may take fragmented approaches and/or no measures to verify that an online identity (e.g., an email account or a website contributor, among other examples) is authentic.

Some implementations described herein relate to an identity verification system that can use a virtual credential to generate or otherwise provide information that can be used to verify whether a user accessing an online account (e.g., a social media account) is the holder of the online account. For example, as described herein, a virtual credential, sometimes referred to as a virtual payment credential, a virtual card number, and/or a virtual credit card, is a computer-generated version of a primary payment credential (e.g., a credit card number) that may be linked to the primary payment credential and used as a substitute for the primary payment credential in a transaction. For example, a financial institution may issue a transaction card (e.g., a credit card) to a person, company, or organization, and a transaction management system of the financial institution may also issue one or more virtual card numbers that can be used with different merchant transaction systems. For example, a first virtual credential may be usable with a first merchant only, a second virtual credential may be usable with a second merchant only, and so on. Accordingly, because virtual credentials can generally be used in the same way as an actual credit card, virtual credentials can offer increased security in online transactions that occur in a context where a physical transaction card is not required or physically presented to a merchant. For example, if a security breach were to result in a first virtual credential being exposed or otherwise compromised (e.g., to a hacker or fraudster), the virtual credential could be used only at the particular merchant and would be unusable with any other merchant(s). In this way, using the virtual credential in an online transaction may reduce a risk that, and/or an extent to which, the virtual credential can be fraudulently used, thereby improving information security. For example, a compromised virtual credential may be invalidated and a new virtual credential may be generated without affecting the primary payment credential and/or any other virtual credentials that may be linked to the primary payment credential.

Accordingly, some implementations described herein may exploit properties of virtual credentials to protect against phishing scams, fraud, misinformation campaigns, and/or other unauthorized or malicious activities of online impersonators (e.g., bots, hackers, or fraudsters, among other examples). In particular, when a person, company, organization, or other customer opens a financial account (e.g., a bank account, a credit card account, or an investment account) associated with a virtual credential service, the financial institution that opens the financial account may require that the customer satisfy one or more proof of identity requirements before the financial account is opened. For example, the customer may be required to provide one or more physical identity documents (e.g., a driver's license, a passport, a birth certificate, a nationally issued identity document, or corporate identification documents) that the financial institution verifies to be associated with a real identity that legitimately belongs to the person or entity presenting the physical identity documents. Accordingly, the financial institution may verify the identity of the holder of the financial account, and the verified identity may be leveraged to verify whether other online activity by the same entity is legitimate through the use of transactions that are performed using virtual credentials linked to the financial account. For example, when a user is accessing an online account associated with an entity (e.g., a person, company, or organization) in order to engage in online activity, the user may select or may be redirected to the identity verification system to perform an identity verification transaction. In some implementations, the identity verification transaction may be performed by generating a virtual credential that is linked to a financial account belonging to the holder of the online account being used to engage in the online activity and using the virtual credential in an online transaction with an entity (e.g., the financial institution or a designated merchant).

Accordingly, in some implementations, the identity verification system may generate an identity verification record when the transaction is completed, where the identity verification record may include various attributes that can be used to verify contemporaneous or near-contemporaneous online activity being performed by the user. For example, the attributes may include a timestamp, a memo or description of the online activity being verified, a fixed or dynamic transaction value, and/or a merchant identifier associated with the transaction, among other examples. In this way, the transaction attributes can be used to verify that the user of the online account also has access to the financial account linked to the virtual credential used in the identity verification transaction. For example, the user may be required to access the financial account to view details associated with the identity verification transaction and supply the details to the identity verification system to confirm that the user has access to the financial account. On the other hand, if the user is an imposter and does not have the ability to access the details associated with the identity verification transaction, the user may be unable to provide the necessary details to confirm the identity of the user. Accordingly, in cases where the user is able to provide sufficient evidence to confirm that the user is authorized to access the financial account linked to the virtual credential used in the identity verification transaction, the identity verification system may provide the user with a link to the identity verification record, which can be included with the information being created or shared using the online account to be verified. Additionally, or alternatively, a link to the identity verification record can be provided to an information receiving system (e.g., a social media platform or other system that the user is interacting with to create or share information), which may use the information in the identity verification record to indicate whether the identity of the user has been verified. In this way, because financial institutions may require a customer to verify an identity (e.g., to satisfy know-your-customer or know-your-client (KYC) regulations), the robust and reliable identity verification protocols used at a financial institution can be used to verify whether other online activity performed by a user purporting to be the same entity is legitimate.

Figure 1B:
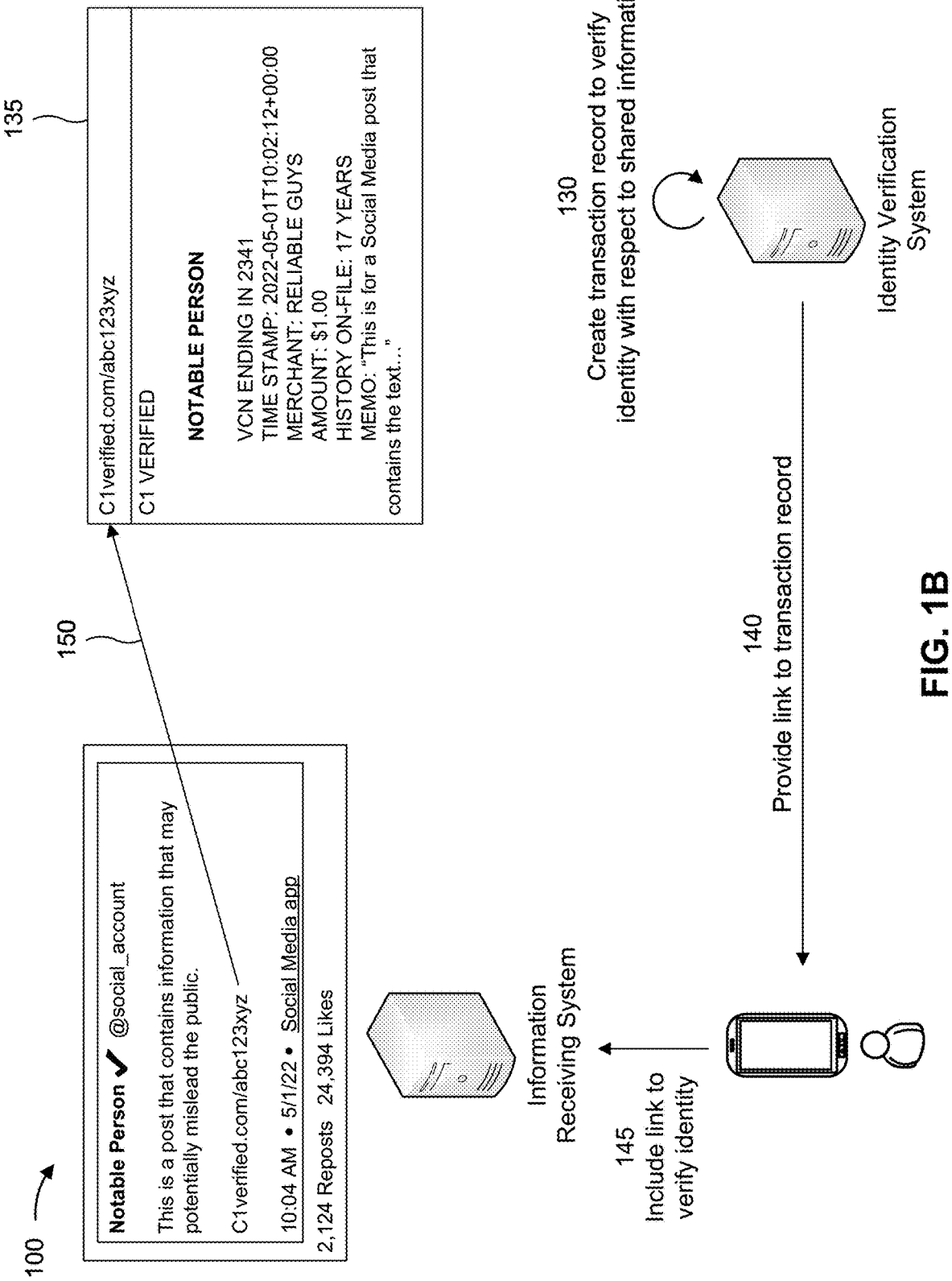
Figure 1C:
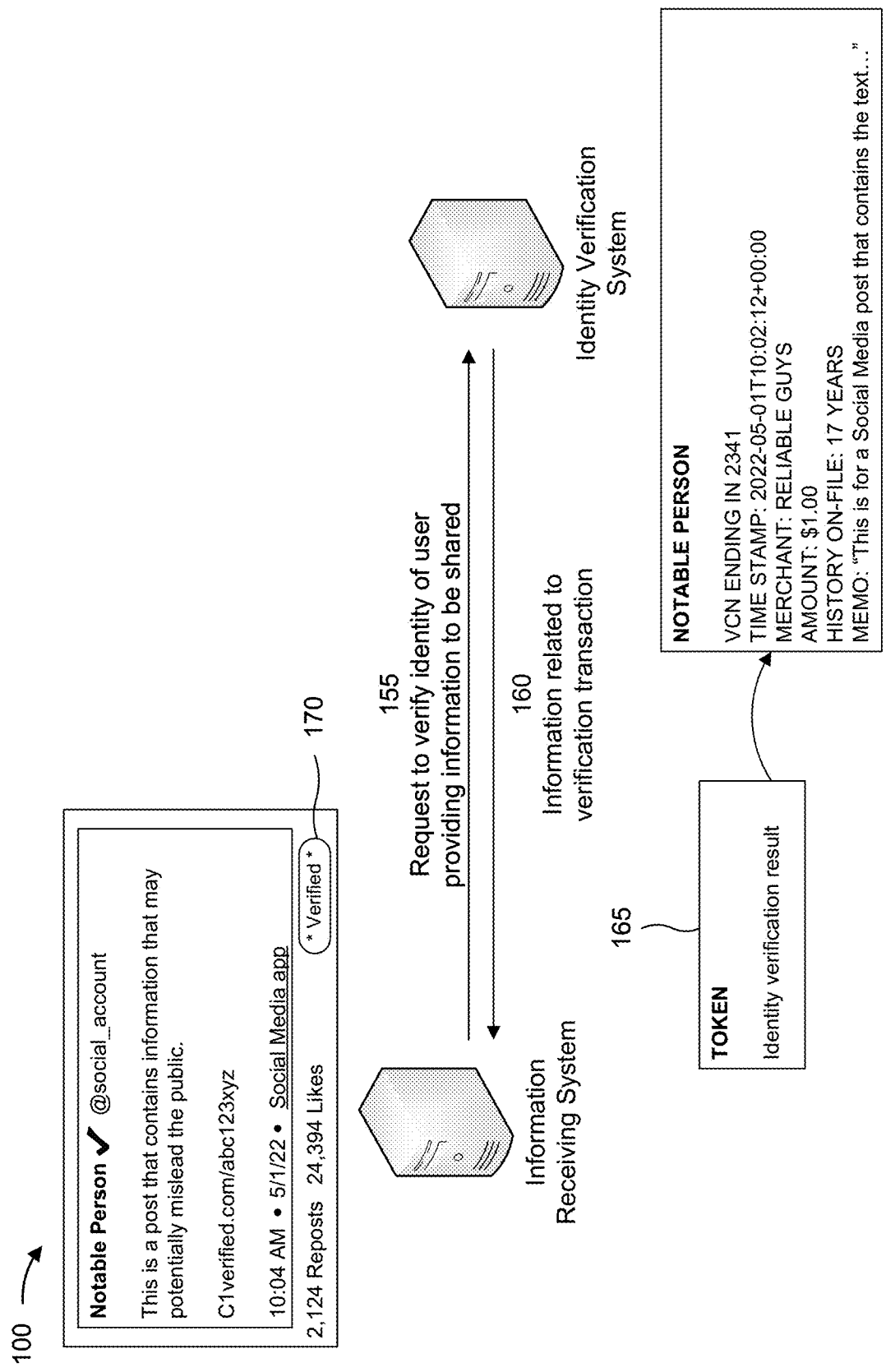

FIGS. 1A-1C are diagrams of an example implementation 100 relating to identity verification using a virtual credential. As shown in FIGS. 1A-1C, example implementation 100 includes an identity verification system, an information receiving system, a user device, and a transaction backend system. The identity verification system, the information receiving system, the user device, and the transaction backend system devices are described in more detail below in connection with FIG. 2 and FIG. 3.

As shown in FIG. 1A, and by reference number 105, the identity verification system may verify an identity associated with an entity during a process to establish a financial account. For example, in some implementations, the identity verification system may be associated with a financial institution, such as a bank, a credit card company, and/or an investment firm, and may require that a potential customer satisfy one or more proof of identity requirements before allowing the potential customer to establish a financial account. For example, a person, company, organization, or other entity may be required to satisfy one or more proof of identity requirements by providing identity documents that are associated with a real identity (e.g., a driver's license or passport for a person, or articles of incorporation, bylaws, or similar documents for a company or organization). Accordingly, the identity verification system may be used to store and/or verify the identity documents that are provided when the financial account is established (e.g., by communicating with one or more government data sources or other independent and authoritative sources to verify that the identity documents are legitimate). Additionally, or alternatively, the identity verification system may support non-documentary identity verification, where the user or customer attempting to establish the financial account is required to provide personal identity data that is then checked against public and/or private databases (e.g., government records and/or credit bureau databases). Additionally, or alternatively, the non-documentary identity verification may include knowledge-based authentication questions that may be presented to the person attempting to open the financial account to ensure that the person owns the identity or is authorized to act on behalf of the owner of the identity (e.g., in the case of an organization or other non-natural person). For example, the identity verification system may calculate an identity score based on the answers provided by the person attempting to open the financial account, and the identity of the person may either be designated as verified or not verified based on the identity score.

Accordingly, when a financial account is established, the identity verification system may generally verify the identity of the person, company, organization, or other entity opening the financial account during account establishment. In general, the identity verification system may perform the identity verification using robust and reliable protocols that satisfy KYC guidelines or other legal requirements or regulations. For example, in the United States, financial institutions are required to implement a customer identification program (CIP) to verify the identity of entities wishing to conduct financial transactions through the financial institutions, where the CIP must be proportionate to the size and type of business conducted by the financial institution and incorporated into a Bank Secrecy Act or anti-money laundering compliance program that is subject to approval by the board of directors of the financial institution. Furthermore, although specific rules and regulations may vary, financial institutions in many other countries are required to satisfy KYC guidelines to ensure that account holders are actually who they claim to be. In this way, the identity verification system may ensure that detailed due diligence is performed to verify the identity of a customer having a financial account, whereby some implementations described herein may leverage the identity verification performed to establish a financial account to verify other online account activity using the same identity.

For example, as further shown in FIG. 1A, and by reference number 110, a user may access an information receiving system to create information to be shared via the information receiving system. In some implementations, as described herein, the information receiving system may be a social media platform, and the user may be attempting to access a social media account in order to share information (e.g., a page or a post containing text, a photo, a video, or other media) on the social media platform. For example, reference number 115 depicts an example where the user is accessing a social media account associated with a notable person (e.g., a celebrity, politician, organization, or public figure) to share a post that contains information that could potentially mislead the public. However, it will be appreciated that social media platforms are merely one example of an online platform that may use the identity verification system to verify online activity performed using an online persona, and that the same or similar techniques described herein can be applied to any other suitable information being created, shared, or otherwise disseminated electronically (e.g., using an email account, an online persona associated with a digital media platform, or the like). Furthermore, it will be appreciated that the identity verification system can be used to verify the identity of a user that is creating information to be shared on a public forum (e.g., a website or social media platform) and/or a user creating information to be shared via a private channel (e.g., an email message).

As further shown in FIG. 1A, and by reference number 120, the user may access the identity verification system to request that the identity verification system verify the identity of the user with respect to the information being shared with the information receiving system. For example, in some implementations, the user may be attempting to create information to be shared with the information receiving system using a first account (e.g., a social media account) that belongs to a particular entity (e.g., a person, company, or organization), and may access the identity verification system in order to request an identity verification transaction using a second account (e.g., a financial account) that belongs to the entity holding the first account. In this way, the user accessing the first account through the information receiving system may use information associated with the identity verification transaction to provide proof that the user is indeed the holder of the first account or authorized to act on behalf of the holder of the first account. Additionally, or alternatively, the information receiving system may direct the user to the identity verification system before finalizing (e.g., posting) the information to be shared such that the user is required to prove that the user is the holder of the first account or authorized to act on behalf of the holder of the first account before the information is shared through the information receiving system. For example, in some implementations, the identity verification system may communicate with the user device (e.g., the device that the user is operating to share information with the information receiving system) to validate an identity associated with the user (e.g., as an additional security measure to prevent fraud in case another user gains unauthorized access to the user device and/or spoofs a unique identifier of the user device). For example, the identity verification system may transmit, to the user device, a message that includes a prompt to validate that the user operating the user device is authorized to access (e.g., make charges against) a primary credential associated with the financial account. In some implementations, the prompt may indicate that the user is to provide a biometric input (e.g., a fingerprint or facial scan) to verify that the user is authorized to access the primary credential, or the prompt may request that the user enter a user name and password, enter a one-time code sent to an email address or phone number associated with the user device, provide an answer to one or more security questions, and/or satisfy a multi-factor authentication requirement to gain access to the financial account associated with the primary credential.

As further shown in FIG. 1A, and by reference number 125, the identity verification system may communicate with the transaction backend system to perform an identity verification transaction using a virtual credential that is linked to the identity-verified financial account held by the same entity associated with the account being accessed to share information with the information receiving system. For example, the identity verification system may generate the virtual credential based on validating the identity of the user operating the user device or otherwise authenticating the request received from the user device. In some implementations, as described herein, the virtual credential, which may be referred to as a virtual payment credential, a virtual card number, and/or a virtual credit card, among other examples, may be a computer-generated version of a primary credential (e.g., a credit card number or other primary account number) associated with the identity-verified financial account, and the virtual credential may be linked to the primary payment credential and used as a substitute for the primary payment credential in the identity verification transaction. For example, a transaction backend system may issue a transaction card (e.g., a credit card), and the identity verification system may be configured to generate one or more virtual credentials that can be linked to the primary credential and used in different identity verification transactions to verify the identity of the user with respect to specific information being shared on another online platform.

For example, in some implementations, the virtual credential may be used in an identity verification transaction that is associated with any suitable amount, such as a nominal amount that the user may be required to verify in order to prove that the user has access to the financial account. For example, the identity verification transaction may charge a small amount (e.g., a few cents) to the virtual credential, and the amount may then be available via an online activity statement associated with the primary credential linked to the virtual credential. In this example, the user may prove that the user has access to the financial account by viewing the online activity and indicating the amount charged to the virtual credential to the identity verification system. Accordingly, when the user indicates the correct amount, the identity verification system may verify that the user is the holder of the financial account. Additionally, or alternatively, in some implementations, the amount that is charged to the virtual credential may be dynamically determined to verify the identity of the user in one or more additional dimensions. For example, in a social media context, a dynamic amount may be charged to the virtual credential depending one or more parameters that relate to the social media account being accessed to share information with the information receiving system (e.g., based on a number of followers, a non-profit or for-profit status, and/or a number of posts per day, among other examples, where a particular amount or value for the identity verification transaction may correspond to a number of followers in a particular range, a particular organizational status, or a number of daily posts in a particular range). Additionally, or alternatively, a merchant identifier associated with the identity verification transaction may be based on one or more parameters that relate to the account being accessed to share information with the information receiving system (e.g., the merchant may be the financial institution that manages the financial account or a designated third party merchant, where the merchant identity may correspond to certain account parameters).

As shown in FIG. 1B, and by reference number 130, the identity verification system may create a record of the identity verification transaction to verify the identity of the user with respect to the information being shared with the information receiving system after the identity verification transaction is complete. In some implementations, the identity verification system may create the record based on the user of the user device providing one or more inputs or other information that is sufficient to prove that the user is authorized to access the financial account linked to the virtual credential used in the identity verification transaction (e.g., by way of a primary credential or primary account number). For example, the identity verification system may create the record based on the user verifying the last four digits of the virtual credential used in the identity verification transaction, based on the user confirming the merchant identifier associated with the identity verification transaction, and/or based on the user confirming the amount of the identity verification transaction, among other examples. Furthermore, in some implementations, the identity verification system may reverse the identity verification transaction after creating the record of the identity verification transaction. For example, the identity verification transaction may be considered a "dummy" transaction that is used only for the purpose of verifying that the user is authorized to access the financial account, and may therefore be reversed after the record is created to avoid incurring charges against the financial account (e.g., similar to a temporary credit card hold that is used for authorization and later reversed).

Accordingly, when the user suitably confirms access to the financial account linked to the virtual credential used in the identity verification transaction, the identity verification system may create and store the record of the identity verification transaction to indicate that the identity of the user has been proven or otherwise verified with respect to certain information being shared with the information receiving system. For example, the user may provide a description, such as a memo or other narrative, to indicate a context for the identity verification transaction, and the description may be stored as an attribute of the record to indicate the shared information associated with the verified user identity. For example, in FIG. 1B, reference number 135 illustrates an example record that may be created and stored by the identity verification system, where the record may include the name of the account holder, information associated with the virtual credential used in the identity verification transaction, a merchant name, an amount, a length of history that the account holder has with the financial institution, and/or a memo describing the shared information to be associated with the verified user identity. Accordingly, the record may indicate that the identity verification transaction has a timestamp that is contemporaneous or nearly contemporaneous with (e.g., within a threshold time period of) the information shared with the information receiving system and/or includes other attributes (e.g., an amount, a merchant identifier, and/or a memo) to indicate the shared information that is associated with the record of the identity verification transaction.

In some implementations, after creating the record of the identity verification transaction, the identity verification system may provide access to the record of the identity verification transaction in cases where the user is able to prove that the user has access to the financial account linked to the virtual credential used in the identity verification transaction. In this way, the identity verification system may generate and enable access to information to indicate that the identity associated with the user creating or sharing information on the information receiving system has been verified. Alternatively, in cases where the user is unable to prove that the user has access to the financial account linked to the virtual credential used in the identity verification transaction, the identity verification system may return, to the user device and/or the information receiving system, information indicating that the identity of the user is unverified or that the user is a potential imposter.

As described above, the identity verification system may provide access to the record of the identity verification transaction in cases where the user is able to prove that the user has access to the financial account linked to the virtual credential used in the identity verification transaction. For example, in some implementations, the identity verification system may provide, to the user device, information that can be used to access the information in the record of the identity verification transaction so that other users viewing or consuming the information shared by the user can reliably determine that the user sharing the information is the actual holder of the account and not an imposter. For example, as shown in FIG. 1B, and by reference number 140, the identity verification system may provide, to the user device, a link to the record of the identity verification transaction. In some implementations, the link may point to the record of the identity verification transaction, and in some cases may further enable access to records of other identity verification transactions that were performed using virtual credentials linked to the same financial account (e.g., to show the verified identity status of the user over time). Accordingly, as shown by reference number 145, the user may choose to include the link in the information being shared with the information receiving system, whereby users viewing or consuming the information through the information receiving system may visit the link to verify the identity of the user who shared the information. For example, as shown by reference number 150, the link may be included as text within the information being shared, whereby the link may be selected to view the attributes of the identity verification transaction. In the illustrated example, the information being shared is a social media post that was submitted at 10:04 AM on May 1, 2022, and the link points to a record indicating that the identity of the user was verified by the identity verification system in an identity verification transaction performed at 10:02 AM on May 1, 2022 (based on the timestamp of 2022-05-01T10:02:12+00:00). In addition, the record includes a memo to describe the social media post and other attributes such as an amount and a merchant identifier that can be used to indicate one or more parameters of the account being verified.

Additionally, or alternatively, the identity verification system may provide access to the record of the identity verification transaction to the information receiving system, which may then use the verified identity information to indicate whether the identity of the user sharing the information has been verified. For example, as shown in FIG. 1C, and by reference number 155, the information receiving system may provide, to the identity verification system, a request to verify the identity of the user sharing the information with the information receiving system (e.g., via an application program interface). Accordingly, as shown by reference number 160, the identity verification system may return information related to the identity verification transaction to the information receiving system. For example, as shown by reference number 165, the information returned to the information receiving system may include a token that includes an identity verification result (e.g., verified or unverified), which may be based on the various attributes in the record of the identity verification transaction (e.g., a timestamp that is within a threshold time period of the time at which the information was shared with the information receiving system and/or a value or merchant identifier that is mapped to one or more parameters associated with the account being accessed via the information receiving system, among other examples). Additionally, or alternatively, in some implementations, the token may point to the record of the identity verification transaction and/or records of other identity verification transactions performed using the same financial account, which may enable the information receiving system to analyze more granular information to verify the identity of the user sharing the information. Accordingly, as shown by reference number 170, the information receiving system may provide an indication (e.g., a verified or unverified status icon) to indicate whether the identity of the user sharing the information was verified through the identity verification system.

As indicated above, FIGS. 1A-1C are provided as an example. Other examples may differ from what is described with regard to FIGS. 1A-1C.

Figure 2:
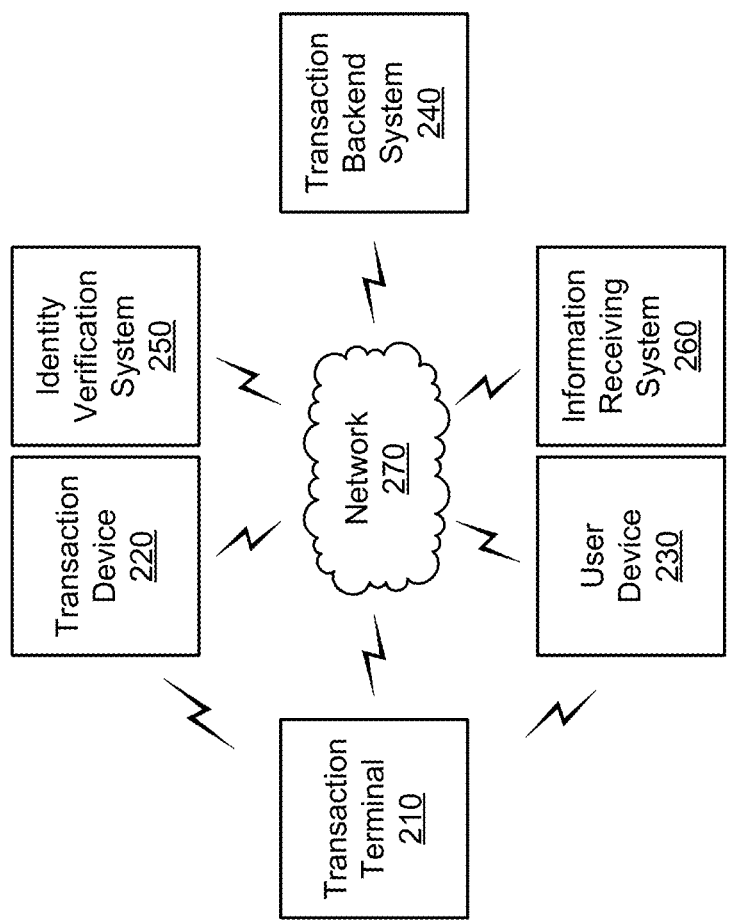
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction terminal 210, a transaction device 220, a user device 230, a transaction backend system 240, an identity verification system 250, an information receiving system 260, and/or a network 270. Devices of environment 200 may interconnect via wired connections and/or wireless connections.

The transaction terminal 210 includes one or more devices capable of facilitating an electronic transaction associated with the transaction device 220. For example, the transaction terminal 210 may include a point-of-sale (PoS) terminal, a payment terminal (e.g., a credit card terminal, a contactless payment terminal, a mobile credit card reader, or a chip reader), and/or an automated teller machine (ATM). The transaction terminal 210 may include one or more input components and/or one or more output components to facilitate obtaining data (e.g., account information) from the transaction device 220 and/or to facilitate interaction with and/or authorization from an owner or accountholder of the transaction device 220. Example input components of the transaction terminal 210 include a number keypad, a touchscreen, a magnetic stripe reader, a chip reader, and/or a radio frequency (RF) signal reader (e.g., a near-field communication (NFC) reader). Example output devices of transaction terminal 210 include a display and/or a speaker.

The transaction device 220 includes one or more devices capable of being used for an electronic transaction. In some implementations, the transaction device 220 includes a transaction card (or another physical medium with integrated circuitry) capable of storing and communicating account information, such as a credit card, a debit card, a gift card, an ATM card, a transit card, a fare card, and/or an access card. In some implementations, the transaction device 220 may be the user device 230 or may be integrated into the user device 230. For example, the user device 230 may execute an electronic payment application capable of performing functions of the transaction device 220 described herein. Thus, one or more operations described herein as being performed by the transaction device 220 may be performed by a transaction card, the user device 230, or a combination thereof.

The transaction device 220 may store account information associated with the transaction device 220, which may be used in connection with an electronic transaction facilitated by the transaction terminal 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 220 and the transaction terminal 210 may communicate with one another by coming into contact with one another (e.g., using a magnetic stripe or an EMV chip) or via contactless communication (e.g., using NFC).

The user device 230 includes one or more devices capable of being used for an electronic transaction, as described above in connection with the transaction device 220. The user device 230 may include a communication device and/or a computing device. For example, the user device 230 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the user device 230 may be capable of receiving, generating, storing, processing, and/or providing information associated with verifying a user identity via the identity verification system 250 and/or sharing information with the information receiving system 260, as described elsewhere herein.

The transaction backend system 240 includes one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 240 (e.g., for fraud detection).

The transaction backend system 240 may be associated with a financial institution (e.g., a bank, a lender, a credit card company, or a credit union) and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the transaction terminal 210, and/or a transaction card association (e.g., VISA® or MASTERCARD®) associated with the transaction device 220. Based on receiving information associated with the transaction device 220 from the transaction terminal 210, one or more devices of the transaction backend system 240 may communicate to authorize a transaction and/or to transfer funds from an account associated with the transaction device 220 to an account of an entity (e.g., a merchant) associated with the transaction terminal 210.

The identity verification system 250 includes one or more devices capable of receiving, generating, storing, processing, providing, and/or routing information associated with verifying a user identity using a virtual credential, as described in more detail elsewhere herein. The identity verification system 250 may include a communication device and/or a computing device. For example, the identity verification system 250 may include a server, such as an application server, a client server, a web server, a database server, a host server, a proxy server, a virtual server (e.g., executing on computing hardware), or a server in a cloud computing system. In some implementations, the identity verification system 250 includes computing hardware used in a cloud computing environment.

The information receiving system 260 includes one or more devices capable of receiving, generating, storing, processing, providing, and/or routing information associated with verifying a user identity using a virtual credential, as described in more detail elsewhere herein. The information receiving system 260 may include a communication device and/or a computing device. For example, the information receiving system 260 may include a server, such as an application server, a client server, a web server, a database server, a host server, a proxy server, a virtual server (e.g., executing on computing hardware), or a server in a cloud computing system. In some implementations, the information receiving system 260 includes computing hardware used in a cloud computing environment.

The network 270 includes one or more wired and/or wireless networks. For example, the network 270 may include a cellular network, a public land mobile network, a local area network, a wide area network, a metropolitan area network, a telephone network, a private network, the Internet, and/or a combination of these or other types of networks. The network 270 enables communication among the devices of environment 200. In some implementations, the transaction terminal 210 may communicate with the transaction device 220 using a first network (e.g., a contactless network or by coming into contact with the transaction device 220) and may communicate with the transaction backend system 240 using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
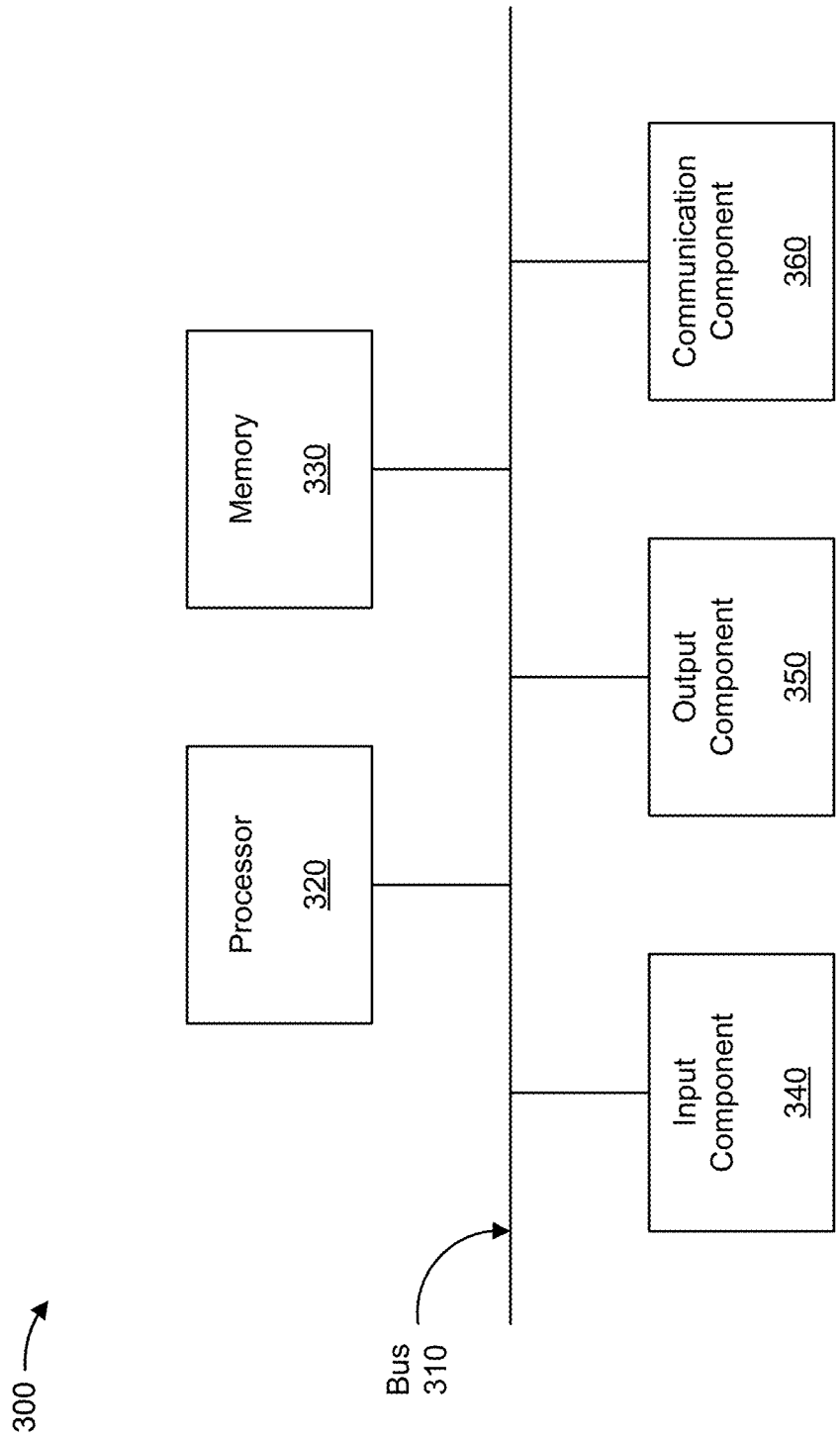
FIG. 3 is a diagram of example components of one or more devices of FIG. 2.

FIG. 3 is a diagram of example components of a device 300, which may correspond to transaction terminal 210, transaction device 220, user device 230, transaction backend system 240, identity verification system 250, and/or information receiving system 260. In some implementations, transaction terminal 210, transaction device 220, user device 230, transaction backend system 240, identity verification system 250, and/or information receiving system 260 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
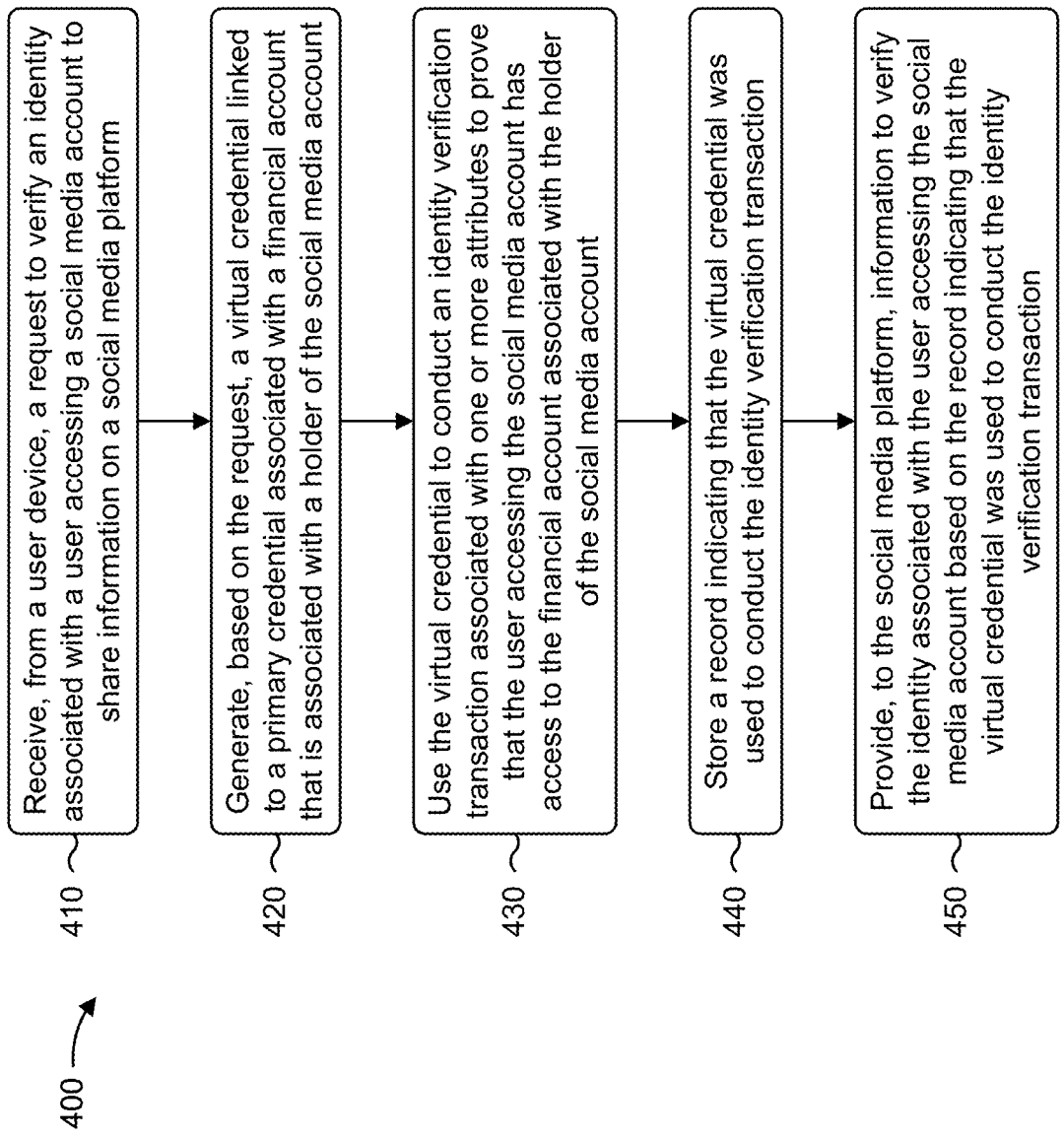
FIG. 4 is a flowchart of an example process relating to identity verification using a virtual credential.

FIG. 4 is a flowchart of an example process 400 relating to identity verification using a virtual credential. In some implementations, one or more process blocks of FIG. 4 may be performed by an identity verification system (e.g., identity verification system 250). In some implementations, one or more process blocks of FIG. 4 may be performed by another device or a group of devices separate from or including the identity verification system, such as transaction terminal 210, transaction device 220, user device 230, transaction backend system 240, and/or information receiving system 260. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, from a user device, a request to verify an identity associated with a user accessing a social media account to share information on a social media platform (block 410). As further shown in FIG. 4, process 400 may include generating, based on the request, a virtual credential linked to a primary credential associated with a financial account that is associated with a holder of the social media account (block 420). In some implementations, the primary credential is associated with one or more proof of identity requirements that the holder of the social media account was required to satisfy to establish the financial account. As further shown in FIG. 4, process 400 may include using the virtual credential to conduct an identity verification transaction associated with one or more attributes to prove that the user accessing the social media account has access to the financial account associated with the holder of the social media account (block 430). As further shown in FIG. 4, process 400 may include storing a record indicating that the virtual credential was used to conduct the identity verification transaction (block 440). As further shown in FIG. 4, process 400 may include providing, to the social media platform, information to verify the identity associated with the user accessing the social media account based on the record indicating that the virtual credential was used to conduct the identity verification transaction (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for verifying an identity associated with a user, the system comprising:
   one or more memories; and
   one or more processors, coupled to the one or more memories, configured to:
      receive a request to verify a user identity corresponding to a first account;
      generate, based on the request, a virtual credential linked to a primary credential associated with a second account,
         wherein the second account corresponds to a holder of the first account;
      conduct an identity verification transaction using the virtual credential;
      store a record of the identity verification transaction indicating that the virtual credential was used to conduct the identity verification transaction; and
      provide, to a social media platform corresponding to the first account, information including a token corresponding to the record,
         wherein the token includes a verification result, and wherein the verification result is based on the record indicating that the virtual credential was used to conduct the identity verification transaction.

2. The system of claim 1, wherein the one or more processors are further configured to:
receive information indicating that the user accessing the first account is authorized to access the second account, wherein the virtual credential is generated and used to conduct the identity verification transaction based on the holder of the first account having access to the second account.

3. The system of claim 1, wherein the identity verification transaction is associated with one or more attributes to prove that the user accessing the first account has access to the second account associated with the holder of the first account.

4. The system of claim 3, wherein the one or more attributes associated with the identity verification transaction include one or more of:
an amount or a merchant identifier related to one or more parameters associated with the first account, or
a timestamp indicating that the identity verification transaction was conducted within a threshold period of time.

5. The system of claim 3, wherein the one or more attributes associated with the identity verification transaction include a description of information that the user is sharing on a public forum corresponding to the first account.

6. The system of claim 3, wherein the one or more attributes associated with the identity verification transaction relate to a history associated with the second account.

7. The system of claim 1, wherein the one or more processors are further configured to:
provide, to a user device, a link to the record indicating that the virtual credential was used to conduct the identity verification transaction.

8. The system of claim 1, wherein the one or more processors are further configured to:
reverse the identity verification transaction based on storing the record indicating that the virtual credential was used to conduct the identity verification transaction.

9. The system of claim 1, wherein the token further corresponds to at least one additional record of an additional identity verification transaction performed using the second account.

10. A method for verifying an identity associated with a user, comprising:
receiving a request to verify a user identity corresponding to a first account;
generating, by an identity verification device and based on the request, a virtual credential linked to a primary credential corresponding to a second account,
wherein the second account corresponds to a holder of the first account;
conducting, by the identity verification device, an identity verification transaction using the virtual credential,
wherein the identity verification transaction is associated with one or more attributes to prove that the user accessing the first account has access to the second account;
storing, by the identity verification device, a record of the identity verification transaction indicating that the virtual credential was used to conduct the identity verification transaction; and
providing, by the identity verification device to a social media platform corresponding to the first account, information including a token corresponding to the record,
wherein the token includes a verification result, and
wherein the verification result is based on the record indicating that the virtual credential was used to conduct the identity verification transaction.

11. The method of claim 10, wherein the one or more attributes associated with the identity verification transaction include one or more of an amount or a merchant identifier related to one or more parameters associated with the first account.

12. The method of claim 10, wherein the one or more attributes associated with the identity verification transaction include a timestamp indicating that the identity verification transaction was conducted within a threshold period of time of the user creating the information.

13. The method of claim 10, wherein the one or more attributes associated with the identity verification transaction include a description of the information created by the user.

14. The method of claim 10, wherein the one or more attributes associated with the identity verification transaction relate to a history associated with the second account.

15. The method of claim 10, further comprising:
providing, to the information receiving device, a link to the record indicating that the virtual credential was used to conduct the identity verification transaction.

16. A non-transitory computer-readable medium storing a set of instructions, the set of instructions comprising:
one or more instructions that, when executed by one or more processors of an identity verification system, cause the one or more processors of the identity verification system to:
receive, from a user device, information indicating that a user accessing a social media account is authorized to access a financial account associated with a holder of the social media account;
generate, based on the information, a virtual credential linked to a primary credential corresponding to the financial account,
wherein the financial account corresponds to the holder of the social media account;
conduct an identity verification transaction using the virtual credential,
wherein the identity verification transaction corresponds to one or more attributes indicating user access to the financial account;
store a record of the identify verification transaction;
provide, to the user device, a link to the record indicating that the virtual credential was used to conduct the identity verification transaction; and
provide, to a social media platform corresponding to the social media account, information derived from the record, wherein the information includes the link provided to the user device, to verify the identity of the user accessing the social media account.

17. The non-transitory computer-readable medium of claim 16, wherein the one or more attributes associated with the identity verification transaction include one or more of an amount or a merchant identifier related to one or more parameters associated with the social media account.

18. The non-transitory computer-readable medium of claim 16, wherein the one or more attributes associated with the identity verification transaction include a timestamp indicating that the identity verification transaction was conducted within a threshold period of time.

19. The non-transitory computer-readable medium of claim 16, wherein the one or more attributes associated with the identity verification transaction include a description of the information that the user is sharing on a public forum corresponding to the social media account.

20. The non-transitory computer-readable medium of claim 16, wherein to provide the information to the social media platform, the one or more instructions, when executed, further cause the one or more processors to:
   verify the identity associated with the user accessing the social media account based on the record indicating that the virtual credential was used to conduct the identity verification transaction.

* * * * *